(12) United States Patent
Harmon et al.

(10) Patent No.: US 11,577,656 B2
(45) Date of Patent: Feb. 14, 2023

(54) VEHICLE SYSTEM

(71) Applicant: Ford Global Technologies, LLC, Dearborn, MI (US)

(72) Inventors: Michael John Harmon, Westland, MI (US); Carlos Gonzales, Berkley, MI (US); Gabriella Marie Gyllenhoff Jacobsen, Ferndale, MI (US); Michael Huskey, Farmington, MI (US); Arnav Wagh, Detroit, MI (US); Daveanand M. Singh, Detroit, MI (US); David Vondle, Chicago, IL (US); David Russell, Plymouth, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 322 days.

(21) Appl. No.: 17/085,553

(22) Filed: Oct. 30, 2020

(65) Prior Publication Data

US 2022/0134959 A1    May 5, 2022

(51) Int. Cl.
*B60R 7/04* (2006.01)
*B60N 3/10* (2006.01)
*B60R 16/03* (2006.01)
*B60R 7/08* (2006.01)
*B60H 1/00* (2006.01)

(52) U.S. Cl.
CPC ........... *B60R 7/04* (2013.01); *B60H 1/00564* (2013.01); *B60N 3/10* (2013.01); *B60R 7/043* (2013.01); *B60R 7/08* (2013.01); *B60R 16/03* (2013.01)

(58) Field of Classification Search
CPC .. B60R 7/04; B60R 7/043; B60R 7/08; B60R 16/03; B60H 1/00564
USPC ................... 296/24.34, 37.8, 37.1
See application file for complete search history.

(56) References Cited

U.S. PATENT DOCUMENTS

| | | |
|---|---|---|
| 3,088,771 A | 5/1963 | Weigle |
| 3,526,314 A | 9/1970 | Trammell |
| 6,074,000 A | 6/2000 | Wagner |
| 6,497,443 B2 | 12/2002 | Worrell |
| 6,540,279 B1 | 4/2003 | Bargiel |
| 6,824,029 B2 | 11/2004 | Tuel, Jr |
| 6,877,807 B2 | 4/2005 | Mizuno |
| 6,921,118 B2 | 7/2005 | Clark |
| 7,029,048 B1 | 4/2006 | Hicks |
| 7,121,606 B2 | 10/2006 | Khan |
| 7,318,616 B1 | 1/2008 | Bradley |
| 7,416,235 B2 | 8/2008 | Rajappa |

(Continued)

FOREIGN PATENT DOCUMENTS

| | | |
|---|---|---|
| DE | 102014226473 A1 | 6/2016 |
| KR | 200352091 Y1 | 6/2004 |

*Primary Examiner* — D Glenn Dayoan
*Assistant Examiner* — E Turner Hicks
(74) *Attorney, Agent, or Firm* — Vichit Chea; Price Heneveld LLP (57) ABSTRACT

A vehicle system includes a floor. A dashboard is positioned vehicle-upward of the floor. A plurality of seating assemblies are coupled to the floor and are arranged into a first row and a second row. A base is coupled to the floor and comprises a trough that extends vehicle-rearward from a forward end to a rearward end. A storage console is coupled to the base and is operable to slide within the trough between a forward position that is proximate to the forward end, a rearward position that is proximate to the rearward end, and an intermediate position there between.

20 Claims, 9 Drawing Sheets

(56) References Cited

U.S. PATENT DOCUMENTS

| | | | |
|---|---|---|---|
| 8,616,605 B2* | 12/2013 | Hipshier | B60R 7/04 296/37.8 |
| 8,770,661 B2 | 7/2014 | Kalergis | |
| 9,463,752 B1 | 10/2016 | Lehtonen | |
| 2002/0005649 A1 | 1/2002 | Hofmann | |
| 2007/0075558 A1* | 4/2007 | Kim | B60R 7/04 296/24.34 |
| 2007/0296234 A1 | 12/2007 | Sturt | |
| 2008/0007079 A1 | 1/2008 | Sturt | |
| 2009/0115229 A1 | 5/2009 | Messner | |
| 2010/0078954 A1* | 4/2010 | Liu | B60R 7/04 296/37.8 |
| 2011/0127791 A1* | 6/2011 | Penner | B60R 7/04 296/24.34 |
| 2015/0091319 A1* | 4/2015 | Mather | B60N 2/753 296/24.34 |
| 2015/0353020 A1* | 12/2015 | Dassen | B60N 3/08 296/37.14 |
| 2022/0144177 A1* | 5/2022 | Thomas | B60R 7/04 |

\* cited by examiner

VEHICLE SYSTEM

FIELD OF THE DISCLOSURE

The present disclosure generally relates to a system for vehicle interiors. More specifically, the present disclosure relates to a vehicle interior system that includes a trough and a storage console disposed within the trough.

BACKGROUND OF THE DISCLOSURE

Vehicles often include a fixed center console that is difficult for passengers seated in rear rows of the vehicle to access. A vehicle that includes a trough and a storage console movably disposed within the trough may be desired.

SUMMARY OF THE DISCLOSURE

According to a first aspect of the present disclosure, a vehicle system includes a floor. A dashboard is vehicle-upward of the floor. A plurality of seating assemblies are coupled to the floor and are arranged into a first row and a second row. The first row is positioned between the dashboard and the second row. A base is coupled to the floor and includes a trough that extends vehicle-rearward from a forward end that is vehicle-forward of the first row to a rearward end that is vehicle-rearward of the first row. A storage console is coupled to the base and is operable to slide within the trough between a forward position proximate to the forward end, a rearward position proximate to the rearward end, and an intermediate position there between. The trough defines a rear storage area between the storage console and the rearward end in the forward and intermediate positions of the storage console, and the trough defines a forward storage area between the storage console and the forward end in the rearward and intermediate positions of the storage console.

Embodiments of the first aspect of the present disclosure may include any one or a combination of the following features:
- the forward end is disposed beneath the dashboard;
- a hook coupled to the dashboard and operable between a stowed position and a use position, wherein the trough is positioned beneath the hook in the use position;
- the hook is positioned vehicle-rearward of the forward end in the use position;
- a shelf coupled to the dashboard and extending vehicle-rearward therefrom, wherein the hook is coupled to the shelf;
- the storage console is disposed beneath the shelf in the forward position;
- the storage console includes a receptacle and a door operably coupled to the receptacle;
- a duct configured to convey conditioned air of an HVAC system, wherein the duct extends through an interior of the base;
- at least one of the plurality of seating assemblies includes a seat base, a seatback coupled to the seat base, and a drawer coupled to the seat base and operable between a first open position, a second open position, and a closed position there between, wherein the drawer in the first open position is positioned vehicle-forward of the drawer in the closed position, and the drawer in the second open position is positioned vehicle-rearward of the drawer in the closed position; and
- a locking feature coupled to the storage console and operable between a disengaged condition and an engaged condition, wherein the locking feature is configured to prevent sliding movement of the storage console within the trough.

According to a second aspect of the present disclosure, a vehicle system includes a base coupled to a floor of the vehicle. The base includes a trough that extends from a forward end to a rearward end. A storage console is operable to move within the trough between a forward position proximate to the forward end, a rearward position proximate to the rearward end, and an intermediate position there between. The trough defines a rear storage area between the storage console and the rearward end in the forward and intermediate positions of the storage console, and the trough defines a forward storage area between the storage console and the forward end in the rearward and intermediate positions of the storage console.

Embodiments of the second aspect of the present disclosure may include any one or a combination of the following features:
- the storage console includes a bottom proximate to the trough, a receptacle coupled to the bottom, a door operably coupled to the receptacle, and a console shelf positioned between the bottom and the door and protruding outward generally toward the rearward end of the trough;
- the storage console includes at least one console drawer operable to move from a closed position to an open position by sliding generally away from the rearward end of the trough, wherein the receptacle is positioned between the console shelf and the at least one console drawer;
- the base includes a first trough side wall, a second trough side wall opposite the first trough side wall, a rear trough end wall positioned between the first and second trough side walls, and a forward trough end wall positioned between the first and second trough side walls opposite the rear trough end wall, wherein the first trough side wall extends a first distance between the rear and forward trough end walls, and the rear trough end wall extends a second distance between the first and second trough side walls, wherein the first distance is greater than the second distance;
- a duct configured to convey conditioned air of an HVAC system, wherein the duct extends through an interior of the base within the first trough side wall; and
- the distance between the first and second trough side walls is smallest between the forward and rear trough end walls.

According to a third aspect of the present disclosure, a vehicle system includes a floor. A housing is coupled to the floor and defines a transmission tunnel. A trough is coupled to the housing and includes a first trough side wall, a second trough side wall opposite the first trough side wall, a rear trough end wall positioned between the first and second trough side walls, and a forward trough end wall positioned between the first and second trough side walls opposite the rear trough end wall. The first trough side wall extends a first distance between the rear and forward trough end walls, and the rear trough end wall extends a second distance between the first and second trough side walls, wherein the first distance is greater than the second distance. A storage console is operable to slide within the trough between a forward position proximate to the forward trough end wall, a rearward position proximate to the rear trough end wall, and an intermediate position there between.

Embodiments of the third aspect of the present disclosure may include any one or a combination of the following features:

a duct configured to convey conditioned air of an HVAC system, wherein the duct extends within the first trough side wall vehicle-upward of the transmission tunnel;

the trough defines a rear storage area between the storage console and the rearward end in the forward and intermediate positions of the storage console, and the trough defines a forward storage area between the storage console and the forward end in the rearward and intermediate positions of the storage console; and the storage console includes a receptacle and a door operably coupled to the receptacle.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Additional features and advantages of the present disclosure will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-10, a vehicle 10 includes a floor 12. A dashboard 14 is positioned vehicle-upward from the floor 12. A plurality of seating assemblies 16 are coupled to the floor 12 and are arranged into a first row 18A and a second row 18B. The first row 18A is positioned between the dashboard 14 and the second row 18B. A base 20 is coupled to the floor 12. The base 20 includes a trough 22 that extends vehicle-rearward from a forward end 24 that is vehicle-forward of the first row 18A to a rearward end 26 that is vehicle-rearward of the first row 18A. A storage console 28 is coupled to the base 20 and is operable to slide within the trough 22 between a forward position that is proximate to the forward end 24, a rearward position that is proximate to the rearward end 26, and an intermediate position there between. The trough 22 defines a rear storage area 30A between the storage console 28 and the rearward end 26 in the forward and intermediate positions of the storage console 28. The trough 22 defines a forward storage area 30B between the storage console 28 and the forward end 24 in the rearward and intermediate positions of the storage console 28.

Figure 1:
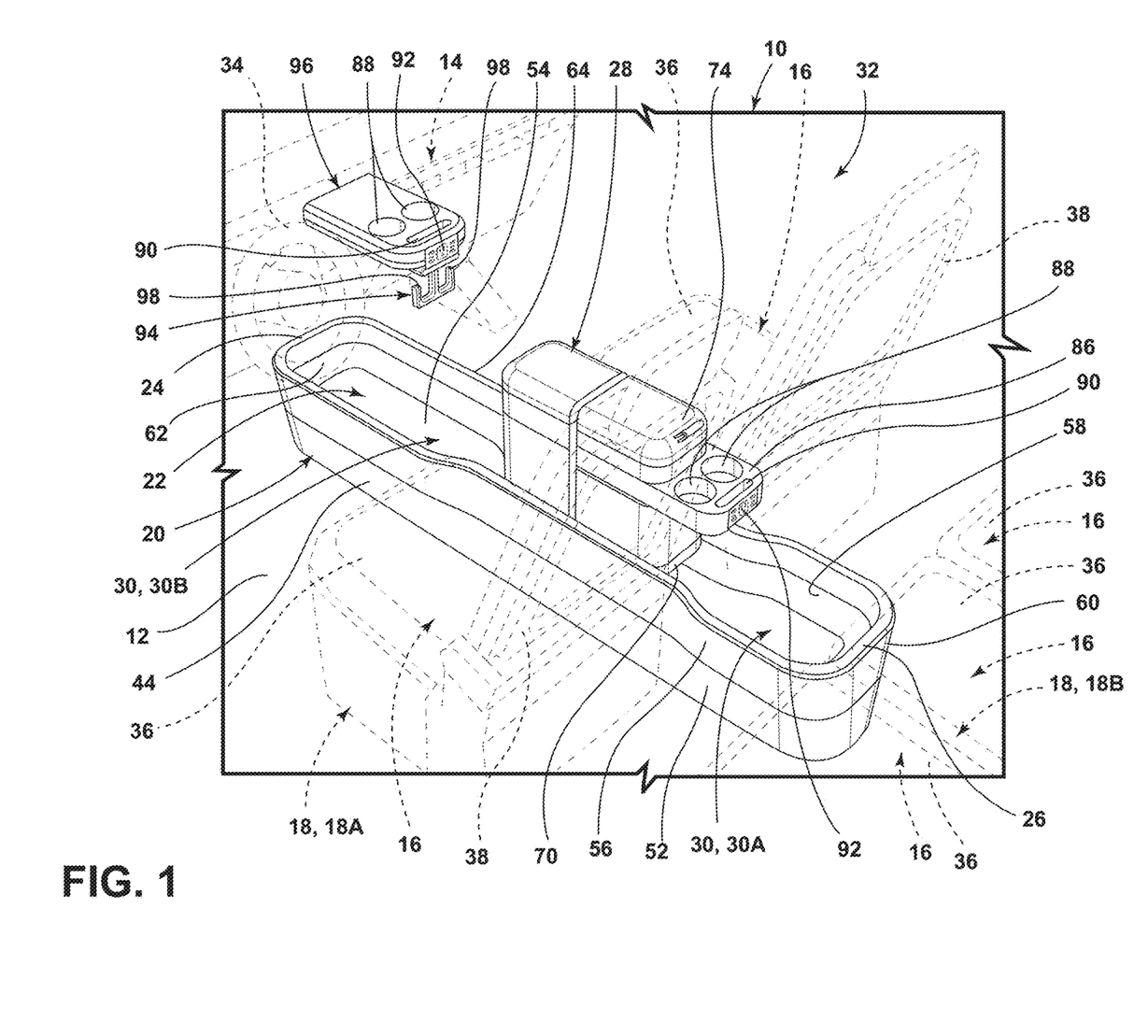
FIG. 1 is an upper perspective view of a vehicle interior, illustrating a base having a trough, a storage console disposed within the trough, and a hook coupled to a dashboard, according to one embodiment.

Referring now to FIG. 1, the vehicle 10 includes a vehicle interior 32. The vehicle interior 32 includes the floor 12 and the dashboard 14 positioned vehicle-upward from the floor 12. As illustrated in FIG. 1, the dashboard 14 is positioned proximate to a vehicle-forward end of the vehicle interior 32 and has a steering wheel 34 coupled thereto. The vehicle interior 32 may include a plurality of seating assemblies 16. The plurality of seating assemblies 16 may be arranged into rows of seating 18. In some embodiments, the plurality of seating assemblies 16 may be arranged to form a first row 18A and a second row 18B. For example, as illustrated in FIG. 1, the plurality of seating assemblies 16 includes a first front seating assembly 16, shown here as a driver seat, a second front seating assembly 16, shown here as a front passenger seat, and three rear seating assemblies 16 positioned vehicle-rearward of the first and second front seating assemblies 16 to form bench-style seating. The first and second front seating assemblies 16 are arranged to form the first row 18A, and the bench-style seating assemblies 16 are arranged to form the second row 18B. A variety of types of seating assemblies 16 (e.g., captain's chairs, bucket seats, bench-style seats, etc.) and more or fewer rows of seating 18 are contemplated in various implementations.

Figure 7:
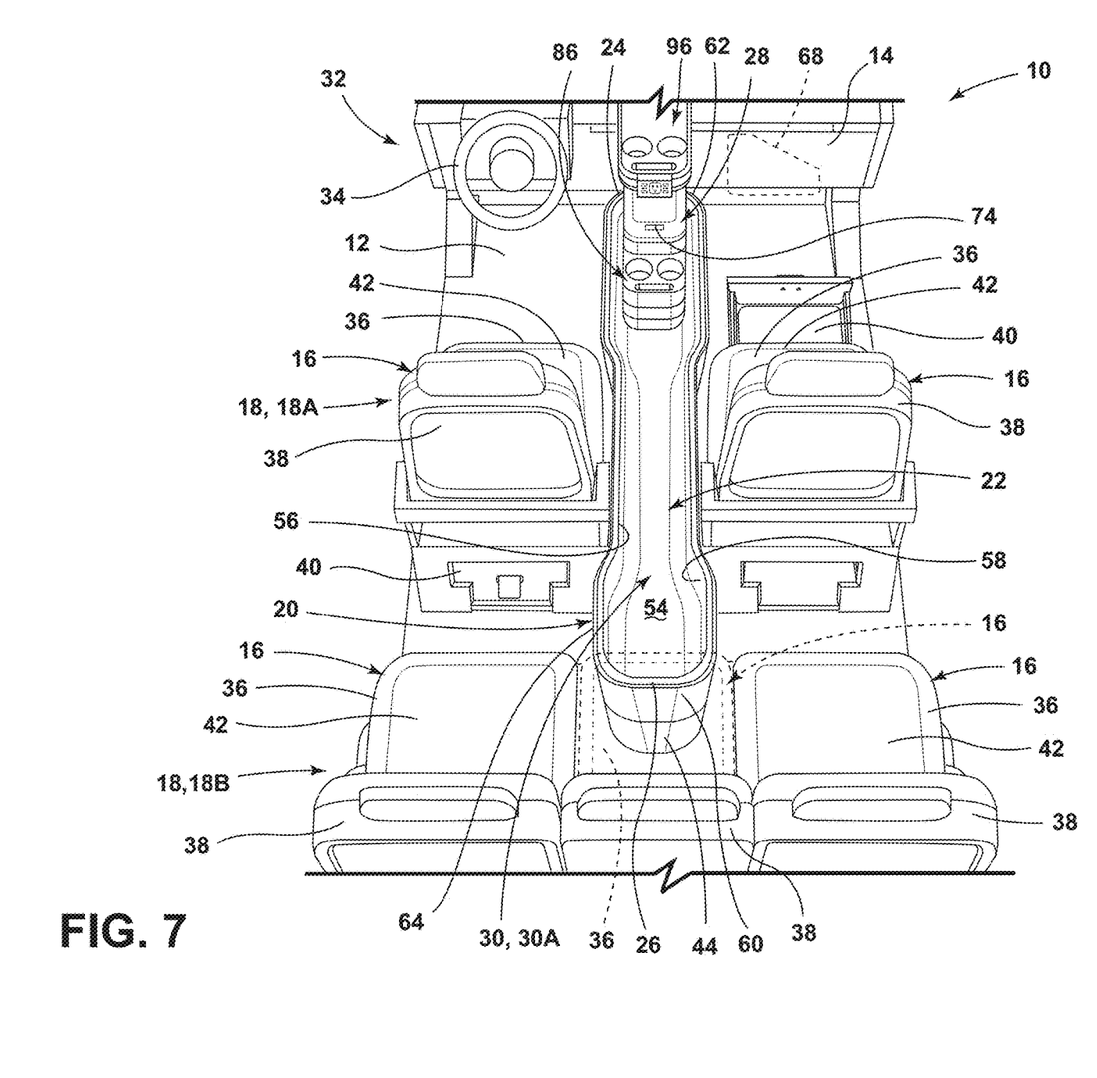
FIG. 7 is an upper perspective view of the vehicle interior, illustrating the storage console in a forward position within the trough of the base and a drawer coupled to a seat base of a seating assembly in a first open position, according to one embodiment.
Figure 8:
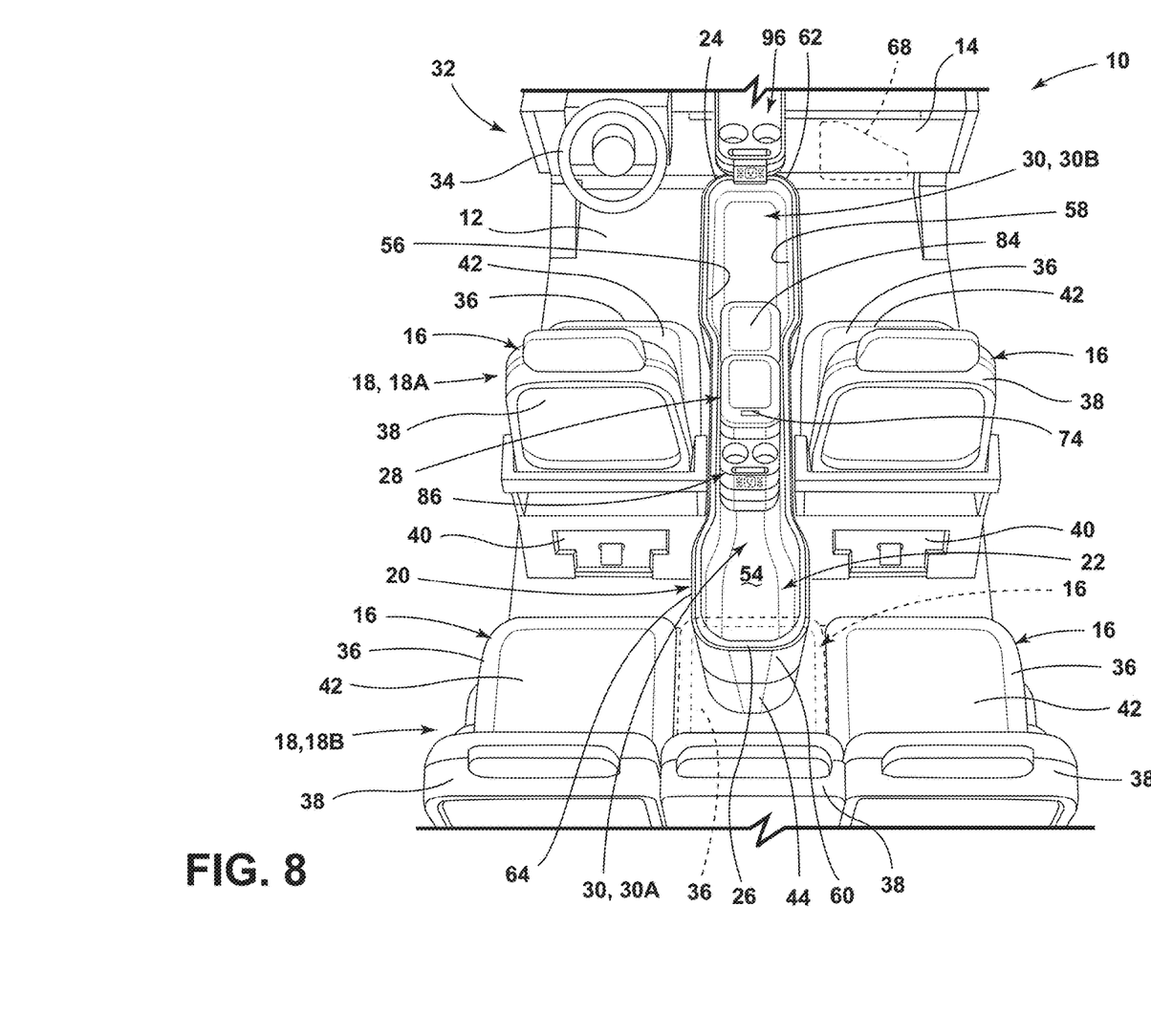
FIG. 8 is an upper perspective view of the vehicle interior, illustrating the storage console in an intermediate position within the trough of the base and the drawer coupled to the seat base of the seating assembly in a closed position, according to one embodiment.
Figure 9:
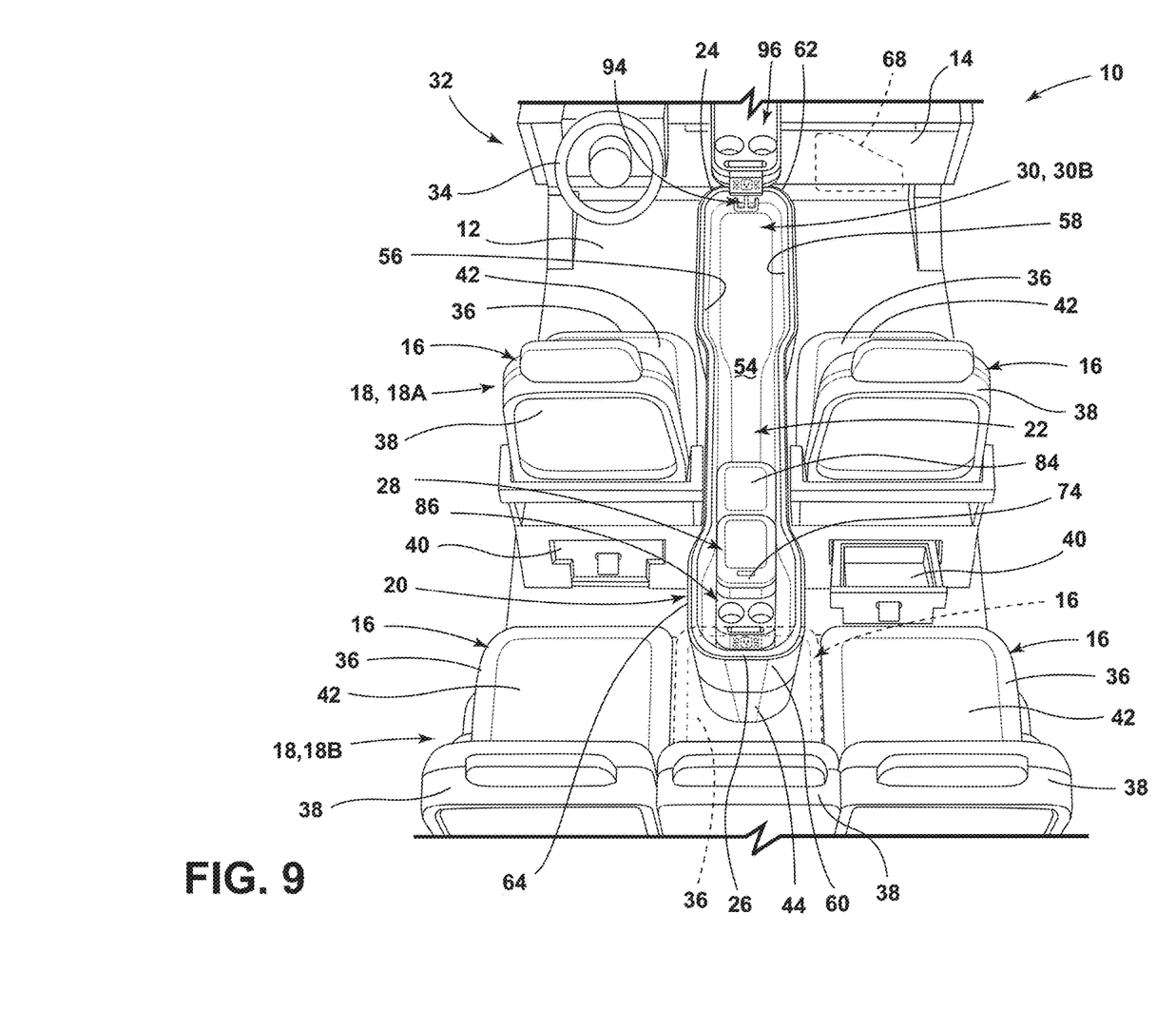
FIG. 9 is an upper perspective view of the vehicle interior, illustrating the storage console in a rearward position within the trough of the base and the drawer coupled to the seat base of the seating assembly in a second open position, according to one embodiment.

Referring now to FIGS. 1 and 7-9, in various embodiments, at least one of the plurality of seating assemblies 16 may include a seat base 36, a seatback 38 coupled to the seat base 36, and a drawer 40 operably coupled to the seat base 36. The drawer 40 may be positioned between the floor 12 of the vehicle 10 and an upper surface 42 of the seat base 36 that is configured to receive a seated occupant. The drawer 40 may be operable between a first open position, as illustrated in FIG. 7, a second open position, as illustrated in FIG. 9, and a closed position, as illustrated in FIG. 8. In the first open position, the drawer 40 may be positioned vehicle-forward of the position of the drawer 40 in the closed position. Further, the drawer 40 in the second open position may be positioned vehicle-rearward of the position of the drawer 40 in the closed position. In other words, as illustrated in FIGS. 7-9, the drawer 40 may be disposed beneath the upper surface 42 of the seat base 36 in the closed position (i.e., directly vehicle-downward of the upper surface 42 of the seat base 36), the drawer 40 may be accessible from the front of the seating assembly 16 by sliding the drawer 40 vehicle-forward from the closed position to the first open position, and the drawer 40 may be accessible from behind the seating assembly 16 by sliding the drawer 40 vehicle-rearward from the closed position to the second open position. In this way, the drawer 40 of the at least one seating assembly 16 may be accessible to a passenger seated in the at least one seating assembly 16 and may be accessible to another passenger seated vehicle-rearward of the at least one seating assembly 16.

Figure 2:
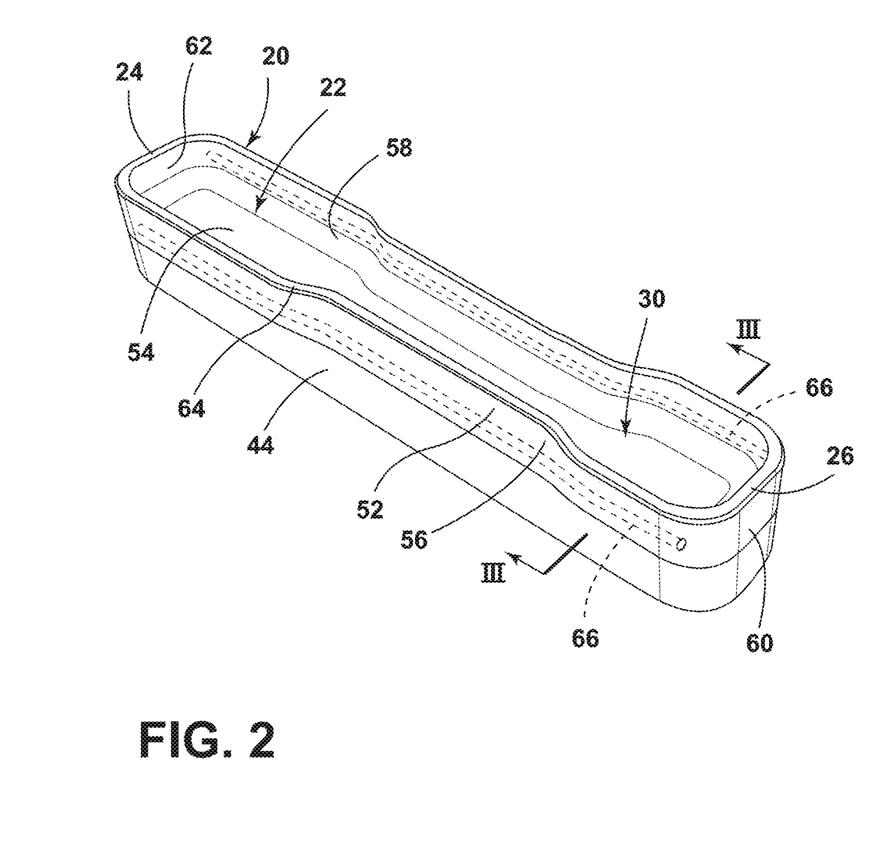
FIG. 2 is an upper perspective view of the base, illustrating a duct extending through an interior of the base, according to one embodiment.
Figure 3:
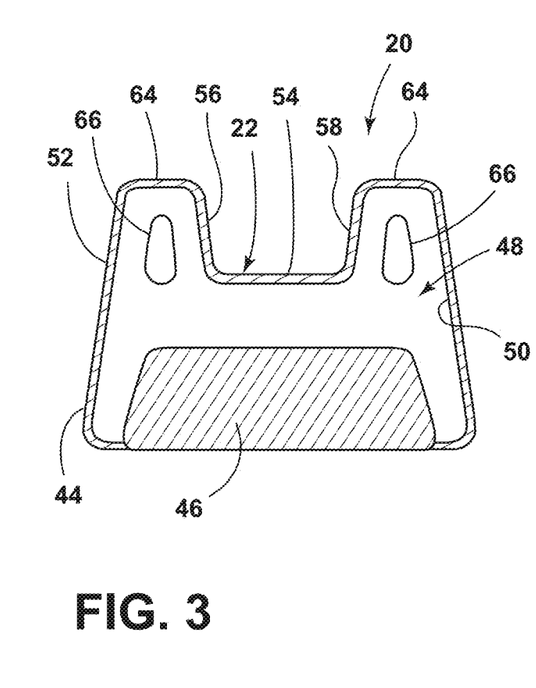
FIG. 3 is a cross-sectional view taken through line III-III of FIG. 2, according to one embodiment.

Referring now to FIGS. 1-3, in various embodiments, the vehicle interior 32 includes the base 20. The base 20 may be coupled to the floor 12. In various embodiments, the base 20 may include a housing 44 that is coupled to the floor 12. The housing 44 may extend upward from the floor 12 and may define a transmission tunnel 46. The transmission tunnel 46 may extend through an interior 48 of the base 20. The interior 48 of the base 20 may include and/or be defined by an interior side 50 of the base 20 and/or the housing 44. The interior side 50 of the base 20 and/or the housing 44 may be opposite an exterior side 52 of the base 20 and/or housing 44, which may be in communication with a cabin of the vehicle 10. As such, the transmission tunnel 46 may be hidden from view by the housing 44 and/or another component of the base 20. The transmission tunnel 46 may be configured to receive, cover, and/or conceal at least a portion of a transmission of the vehicle 10.

Referring still to FIGS. 1-3, in various embodiments, the base 20 may include the trough 22. The trough 22 may be coupled to the housing 44, such that the housing 44 is positioned between the floor 12 and the trough 22. In some embodiments, the trough 22 may be coupled to the floor 12 and extend vehicle-upward therefrom. The trough 22 may extend from a forward end 24 to a rearward end 26. As illustrated in FIG. 1, the trough 22 extends vehicle-rearward from the forward end 24, which is positioned vehicle-forward of the first row of seating 18A, to the rearward end 26, which is positioned vehicle-rearward of the first row of seating 18A. As illustrated in FIGS. 1 and 2, the trough 22 may define an open-topped basin that is elongated from the forward end 24 to the rearward end 26. In various embodiments, the housing 44 may be integrally coupled with the trough 22.

Referring still to FIGS. 1-3, in various embodiments, the trough 22 includes a trough floor 54, a first trough side wall 56, a second trough side wall 58, a rear trough end wall 60, and a forward trough end wall 62. The first and second trough side walls 56, 58 and the rear and forward trough end walls 60, 62 extend from the trough floor 54 to a rim 64 of the trough 22. The second trough side wall 58 is positioned opposite the first trough side wall 56, the rear trough end wall 60 is positioned between the first and second trough side walls 56, 58, and the forward trough end wall 62 is positioned between the first and second trough side walls 56, 58 opposite the rear trough end wall 60. As illustrated in FIGS. 1 and 2, the rear trough end wall 60 is proximate to the rearward end 26 of the trough 22 and the forward trough end wall 62 is positioned proximate to the forward end 24 of the trough 22. In various embodiments, the first trough side wall 56 may extend a first distance between the rear and forward trough end walls 60, 62, and the rear trough end wall 60 may extend a second distance between the first and second trough side walls 56, 58, wherein the first distance is greater than the second distance. In other words, the first trough side wall 56 may be longer than the rear trough end wall 60. In the embodiment illustrated in FIGS. 1 and 2, the first and second trough side walls 56, 58 are longer than the rear and forward trough end walls 60, 62, such that the trough 22 is elongated from the forward end 24 to the rearward end 26.

Referring now to FIGS. 1-3 and 7, in some embodiments, the distance between the first and second trough side walls 56, 58 is smallest between the forward and rear trough end walls 62, 60. In other words, the narrowest portion of the trough 22 may be between the forward end 24 and the rearward end 26 of the trough 22. As illustrated in FIG. 2, the first and second trough side walls 56, 58 initially extend from the forward trough end wall 62 toward the rear trough end wall 60 generally parallel to each other. Before reaching the rear trough end wall 60, the first and second trough side walls 56, 58 generally contract trough-inboard toward each other as they extend toward the rear trough end wall 60. The first and second trough side walls 56, 58 then expand trough-outboard again before finally reaching the rear trough end wall 60. A generally hourglass-shaped trough 22 results. As illustrated in FIG. 7, the narrow portion of the trough 22 may correspond with the first row of seating 18A within the vehicle interior 32. In other words, the wider portions of the trough 22 proximate to the forward and rearward ends 24, 26 of the trough 22 may be positioned vehicle-forward of the first row 18A and vehicle-rearward of the first row 18A, respectively.

Referring now to FIGS. 2 and 3, in some embodiments, one or more ducts 66 may extend through the interior 48 of the base 20. The one or more ducts 66 may be configured to convey conditioned air of an HVAC system 68 of the vehicle 10. In the embodiment illustrated in FIGS. 2 and 3, two ducts 66 configured to convey conditioned air of the HVAC system 68 extend through the interior 48 of the base 20 within the first and second trough side walls 56, 58. It is contemplated that the trough 22 may include a register (not shown) through which conditioned air of the HVAC system 68 is configured to be expelled into the vehicle interior 32.

Referring now to FIGS. 1 and 7-9, the vehicle interior 32 may include the storage console 28. The storage console 28 may be coupled to the base 20. In various embodiments, the storage console 28 may be disposed within the trough 22 of the base 20, as illustrated in FIGS. 1 and 7-9. The storage console 28 may be operable to move within the trough 22. For example, the storage console 28 may be operable to slide toward and away from the forward and rearward ends 24, 26 of the trough 22. As illustrated in FIGS. 7-9, the storage console 28 may be operable to move within the trough 22 between a forward position that is proximate to the forward end 24 (FIG. 7), a rearward position that is proximate to the rearward end 26 (FIG. 9), and an intermediate position there between (FIG. 8). It is contemplated that the storage console 28 may be operable to enter a plurality of intermediate positions between the forward position of the storage console 28 and the rearward position of the storage console 28, in some embodiments.

In various embodiments, the trough 22 may provide one or more storage areas 30 configured to receive objects for storage therein. The storage areas 30 may be defined by the trough 22 between the storage console 28 and the forward end 24 of the trough 22 and/or between the storage console 28 and the rearward end 26 of the trough 22, depending on the position of the storage console 28 within the trough 22, as illustrated in FIGS. 7-9. In some embodiments, the trough 22 may define the rear storage area 30A between the storage console 28 and the rearward end 26 of the trough 22 when the storage console 28 is in the forward position, as illustrated in FIG. 7. The trough 22 may define the forward storage area 30B between the storage console 28 and the forward end 24 of the trough 22 when the storage console 28 is in the rearward position, as illustrated in FIG. 9. Further, the trough 22 may define the rear storage area 30A between the storage console 28 and the rearward end 26 of the trough 22 and the forward storage area 30B between the storage console 28 and the forward end 24 of the trough 22 when the storage console 28 is in the intermediate position, as illustrated in FIG. 8. The storage console 28 being operable to move within the trough 22 may advantageously allow a vehicle occupant to customize the size and/or position of the storage areas 30 provided by the trough 22.

Figure 4:
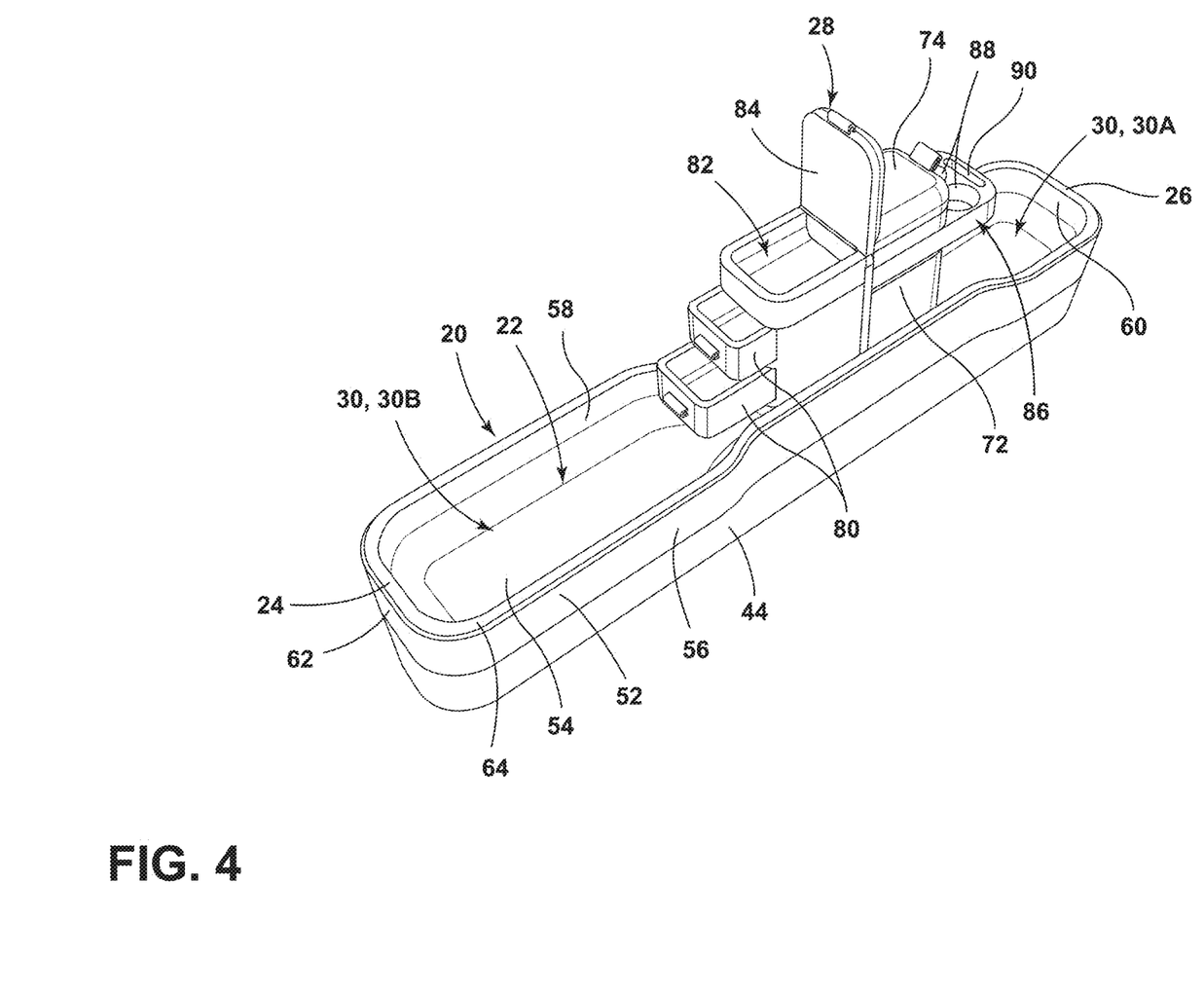
FIG. 4 is an upper perspective view of the storage console within the trough of the base, illustrating a plurality of drawers of the storage console in open positions, according to one embodiment.
Figure 5:
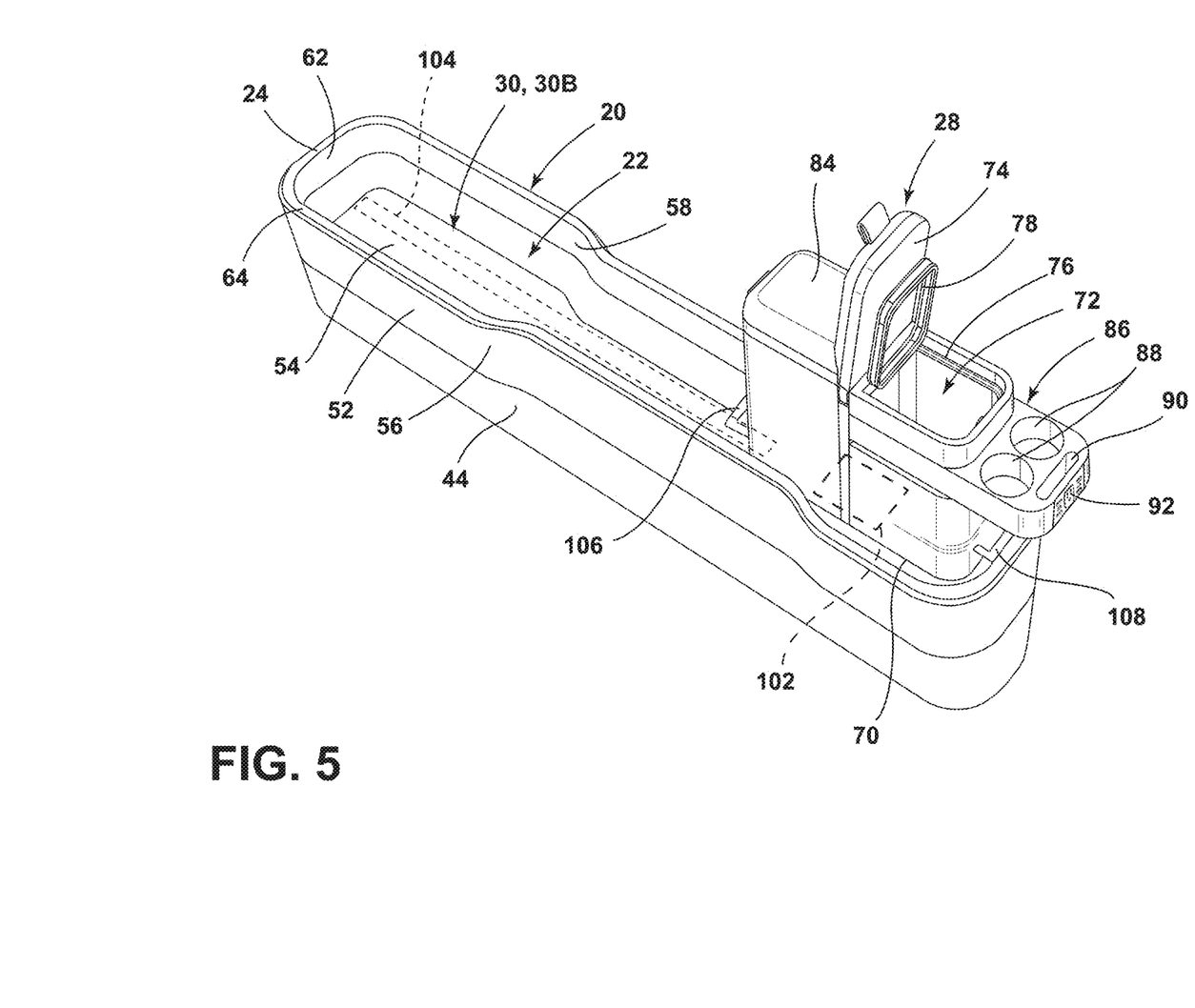
FIG. 5 is an upper perspective view of the storage console within the trough of the base, illustrating a door of the storage console in an open position to reveal a receptacle of the storage console, according to one embodiment.

Referring now to FIGS. 4 and 5, the storage console 28 may include a bottom 70. The bottom 70 may interface and/or be coupled with the trough floor 54. The storage console 28 may include a receptacle 72 that is positioned vehicle-upward from the bottom 70 of the storage console 28. A door 74 may be coupled to the receptacle 72 and may be operable between a closed position and an open position, wherein access to the receptacle 72 is provided. In some embodiments, the storage console 28 may include a bin 76 configured to removably reside within the receptacle 72, and/or a trash bag ring 78, as illustrated in FIG. 5. The trash bag ring 78 may be configured to pivot relative to the storage console 28 to allow for convenient removal and replacement of trash bags wrapped about the trash bag ring 78.

Referring still to FIGS. 4 and 5, in various embodiments, the storage console 28 may include at least one console drawer 80 that is operable to move from a closed position to an open position. In various embodiments, the at least one console drawer 80 may move from the closed position to the open position by sliding generally away from the rearward end 26 of the trough 22. As illustrated in FIGS. 4 and 5, the receptacle 72 may be positioned nearer than the at least one console drawer 80 to the rearward end 26 of the trough 22. As illustrated in FIG. 4, in various embodiments, the storage console 28 includes a plurality of console drawers 80 in a stacked configuration, each of which is operable to open by sliding generally away from the rearward end 26 of the trough 22. As illustrated in FIG. 4, the storage console 28 may include a secondary compartment 82 that is disposed vehicle-upward of the at least one console drawer 80 when the at least one console drawer 80 is in the closed position. A secondary door 84 may be coupled to the storage console 28 and configured to selectively cover the secondary compartment 82. As illustrated in FIGS. 4 and 5, the door 74 to the receptacle 72 and the secondary door 84 to the secondary compartment 82 may be pivotably coupled to the storage console 28 proximate to each other and may be configured to pivot toward each other from the respective closed positions to the respective open positions.

Referring still to FIGS. 4 and 5, in various embodiments, the storage console 28 may include a console shelf 86. The console shelf 86 may be positioned between the bottom 70 of the storage console 28 and the door 74 of the storage console 28. The console shelf 86 may protrude outward from the storage console 28 generally toward the rearward end 26 of the trough 22. As illustrated in FIG. 9, in the rearward position of the storage console 28, the console shelf 86 may extend over the rim 64 of the trough 22 proximate to the rearward end 26 of the trough 22, such that a portion of the rim 64 is positioned beneath the console shelf 86. In other words, the console shelf 86 may extend over the portion of the rim 64, such that the portion of the rim 64 is positioned directly vehicle-downward of the console shelf 86. As illustrated in FIG. 4, the receptacle 72 is positioned between the console shelf 86 and the at least one console drawer 80. The console shelf 86 may include one or more cup holders 88, a receiving slot 90 configured to receive a portable electronic device, one or more electrical connection features 92 (e.g., USB port, electrical outlets, etc.), and/or a combination thereof. It is contemplated that, in various embodiments, the console shelf 86 may include other features and/or omit one or more of the above-mentioned features.

Referring now to FIGS. 1, 6A-7, and 9, in some embodiments, a hook 94 may be coupled to the dashboard 14 of the vehicle 10. The hook 94 may be operable between a stowed position and a use position. In some embodiments, the trough 22 may be positioned beneath the hook 94 when the hook 94 is in the use position. In other words, the trough 22 may be positioned directly vehicle-downward of the hook 94 when the hook 94 is in the use position. In various embodiments, the hook 94 may be positioned vehicle-rearward of the forward end 24 of the trough 22 when the hook 94 is in the use position. In various embodiments, the hook 94 may be configured to support the handles of a bag that is configured to rest within the forward storage area 30B of the trough 22.

Figure 6A:
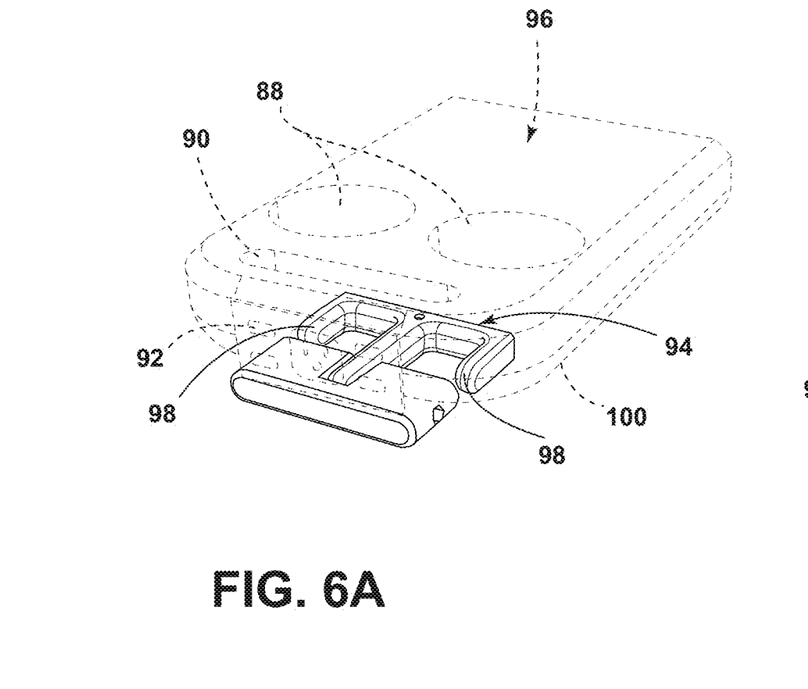
FIG. 6A is an upper perspective view of a hook coupled to an underside of a shelf that is shown in phantom, illustrating the hook in a stowed position, according to one embodiment.
Figure 6B:
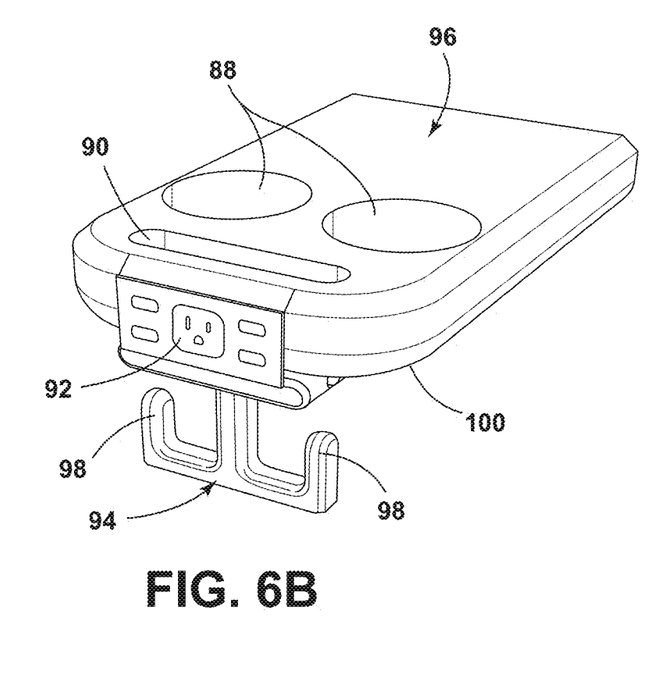
FIG. 6B is an upper perspective view of the hook coupled to the shelf, illustrating the hook in a use position, according to one embodiment.

In the embodiments illustrated in FIGS. 1, 6A-7, and 9, the hook 94 is operably coupled to a shelf 96 extending outward from the dashboard 14 of the vehicle 10. As illustrated, the shelf 96 extends outward from the dashboard 14 of the vehicle 10 generally over a portion of the trough 22. In other words, the shelf 96 extends outward from the dashboard 14, such that the shelf 96 is positioned vehicle-upward of the trough 22 and at least a portion of the shelf 96 is positioned vehicle-rearward of the forward end 24 of the trough 22. In the embodiment illustrated in FIGS. 6A and 6B, the shelf 96 includes cup holders 88, the mobile device receiving slot 90, and a plurality of electrical connection features 92. As illustrated, the hook 94 includes two opposing prongs 98 and is pivotably coupled to an underside 100 of the shelf 96. As such, the hook 94 is configured to pivot from the stowed position, as illustrated in FIG. 6A, to the use position that is vehicle-downward of the stowed position, as illustrated in FIG. 6B. A variety of types of hooks 94 are contemplated. Further, it is contemplated that the hook 94 may be coupled to various portions of the dashboard 14 and/or other vehicle interior components, in some embodiments. As illustrated in FIG. 7, in the forward position of the storage console 28, a portion of the storage console 28 may be positioned beneath the shelf 96 coupled to the dashboard 14. In other words, at least a portion of the storage console 28 may be positioned directly vehicle-downward of the shelf 96 when the storage console 28 is in the forward position. In some embodiments, the shelf 96 coupled to the dashboard 14 may be parallel to the console shelf 86 coupled to the storage console 28.

Referring now to FIGS. 5 and 7-9, a locking feature 102 may be coupled to the storage console 28. The locking feature 102 may be configured to selectively prevent movement of the storage console 28 within the trough 22. For example, in some embodiments the locking feature 102 may be operable between a disengaged condition, wherein sliding movement of the storage console 28 within the trough 22 is not prevented by the locking feature 102, and an engaged condition, wherein the locking feature 102 prevents sliding movement of the storage console 28 within the trough 22. It is to be understood that the locking feature 102 being configured to prevent sliding movement of the storage console 28 within the trough 22 while in the engaged condition, does not necessarily imply that all sliding movement of the storage console 28 within the trough is prevented. For example, small sliding movements of the storage console 28 within the trough 22 that occur when the locking feature 102 is in the engaged condition due to dimensional tolerances of various components and/or play in the system are contemplated. In the engaged condition, the locking feature 102 is configured to prevent movement of the storage console 28 that would otherwise be attainable in the disengaged condition.

In various embodiments, the locking feature 102 may be configured to prevent movement of the storage console 28 in a variety of positions within the trough 22. For example, the locking feature 102 may be operable to enter the engaged condition and prevent movement of the storage console 28 when the storage console 28 is in the forward position, the rearward position, the intermediate position, and/or a variety of other positions within the trough 22. In an exemplary embodiment illustrated in FIG. 5, the storage console 28 is slidably engaged with a guide track 104 that extends along a length of the base 20, such that the storage console 28 may slide within the trough 22 along the guide track 104. The guide track 104 is equipped with a plurality of lock grooves (not shown) that are distributed throughout the length of the guide track 104. The lock grooves are configured to be engaged by the locking feature 102 when the locking feature 102 is in the engaged condition, such that the storage console 28 is generally prevented from sliding along the guide track 104 within the trough 22. Having the plurality of lock grooves along the extent of the guide track 104 allows the locking feature 102 to enter the engaged condition when the storage console 28 is in various positions along the guide track 104. In the embodiment illustrated in FIG. 5, the storage console 28 includes first and second handle levers 106, 108 that are operably coupled to the locking feature 102, such that upon actuation of the first and/or second handle levers 106, 108, the locking feature 102 moves from the engaged condition to the disengaged condition to allow the storage console 28 to slide along the guide track 104 within the trough 22. Upon release of the first and/or second handle levers 106, 108, the locking feature 102 returns to the engaged condition and prevents movement of the storage console 28 along the guide track 104.

It is contemplated that the locking feature 102 may be one or more of a variety of types of features configured to selectively prevent sliding movement of the storage console 28 within the trough 22. In some embodiments, the locking feature 102 may include an electromagnetic feature 110 that is configured to be energized to apply an attraction force to the storage console 28 when the locking feature 102 is in the engaged condition to prevent movement of the storage console 28. The electromagnetic feature 110 may be less energized when the locking feature 102 is in the disengaged condition to allow movement of the storage console 28 within the trough 22.

In some embodiments, an electrical actuator 112 (e.g., motor) may be configured to move the storage console 28 between the forward position, the rearward position, the intermediate position, and/or a variety of other positions within the trough 22. The electrical actuator 112 may be coupled to a controller 114 that is configured to prompt the electrical actuator 112 to move the storage console 28 within the trough 22 based on inputs 116 received from an input device 118. In various embodiments, the input device 118 may be coupled to the vehicle 10, such as a human machine interface 120 (HMI) positioned on the dashboard 14. Various types of input devices 118 coupled to the vehicle 10 are contemplated (e.g., switches coupled to various portions of the vehicle 10, buttons, etc.). In some embodiments, the input device 118 may be a portable electronic device 122, such as a mobile phone, smart watch, or tablet. In such embodiments, a user may conveniently prompt movement of the storage console 28 toward the user despite the storage console 28 initially being out of the reach of the user by entering one or more inputs 116 via the input device 118.

In various embodiments, the locking feature 102 may be coupled to and/or integrated with the electrical actuator 112. Further, in various embodiments, the controller 114 may be coupled to the locking feature 102 and configured to prompt the locking feature 102 to enter the disengaged condition and/or the engaged condition based on one or more inputs 116 received from the input device 118. For example, the controller 114 may be coupled to the electromagnetic feature 110 and be configured to prompt the electromagnetic feature 110 to become more and less energized to selectively prevent movement of the storage console 28 within the trough 22.

Figure 10:
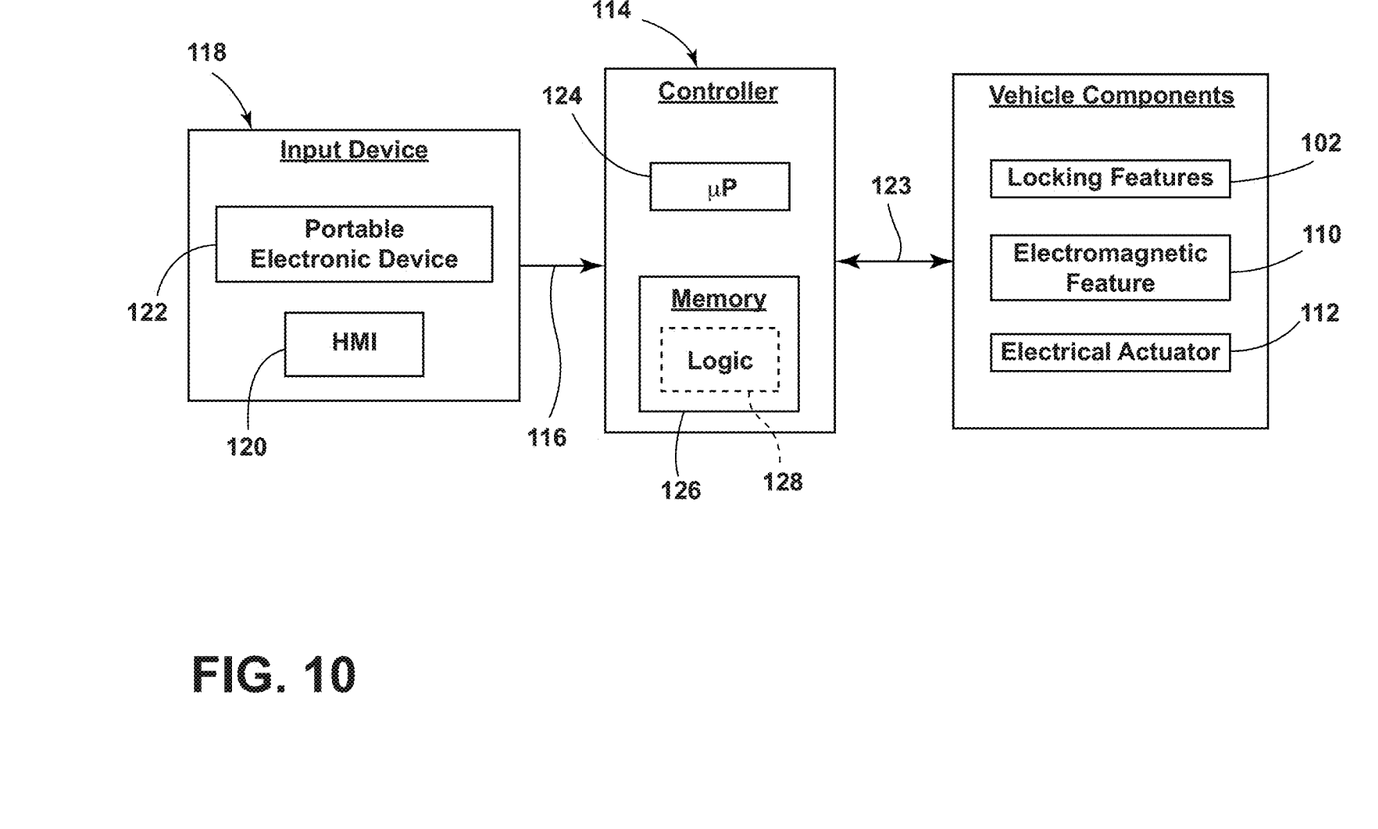
FIG. 10 is a block diagram, illustrating a controller of the vehicle, according to one embodiment.

Referring now to FIG. 10, as referenced above, the vehicle 10 may include the controller 114, which may be configured to receive various inputs 116 and control various outputs 123. The controller 114 may be a shared or dedicated controller 114 that includes a microprocessor 124 and memory 126 as illustrated, according to various embodiments. It should be appreciated that the controller 114 may include control circuitry such as analog and/or digital control circuitry. Stored within the memory 126 and executed by the microprocessor 124 is logic 128 for processing the various inputs 116 and controlling various outputs 123. As referenced above, the inputs 116 to the controller 114 may be received from the input device 118 and may cause the controller 114 to control outputs 123, prompting movement of the storage console 28 within the trough 22 and/or movement of the locking feature 102 between the engaged and disengaged conditions.

In operation of an exemplary embodiment of the present disclosure, the storage console 28 may initially be in the intermediate position within the trough 22, as illustrated in FIG. 8, when a driver of the vehicle 10 stops to pick up a passenger carrying a duffle bag and a beverage. As the passenger enters the vehicle 10 to be seated in the second row of seating 18B, the driver moves the storage console 28 to the rearward position as illustrated in FIG. 9. By moving the storage console 28 to the rearward position, the size of the forward storage area 30B increases, and the cup holder 88 defined by the console shelf 86 of the storage console 28 are positioned nearer to the second row 18B of seating assemblies 16. As such, the forward storage area 30B is able to accommodate the passenger's duffle bag, and the cup holder 88 defined by the console shelf 86 is within reach of the passenger, such that the passenger is able to conveniently deposit the beverage within the cup holder 88.

The present disclosure may provide a variety of advantages. First, the storage console 28 being movable between the forward, intermediate, and rearward positions within the trough 22 may allow for occupants seated in the first row 18A of the vehicle 10 and the second row 18B of the vehicle 10 to access the storage console 28 conveniently. Second, the base 20 including the trough 22 provides additional storage for items within the vehicle 10. Third, the storage console 28 being movable between the forward, intermediate, and rearward positions within the trough 22 conveniently allows a user to customize the position, size, and number of storage areas 30 provided by the trough 22. For example, in the forward position of the storage console 28, the trough 22 defines a relatively large rear storage area 30A, in the rearward position of the storage console 28, the trough 22 provides a relatively large forward storage area 30B, and in the intermediate position of the storage console 28, the trough 22 provides relatively smaller forward and rearward storage areas 30B, 30A.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle system, comprising:
    a floor;
    a dashboard vehicle-upward of the floor;
    a plurality of seating assemblies coupled to the floor and arranged into a first row and a second row, wherein the first row is positioned between the dashboard and the second row;
    a base coupled to the floor and comprising a trough that extends vehicle-rearward from a forward end that is vehicle-forward of the first row to a rearward end that is vehicle-rearward of the first row; and
    a storage console coupled to the base and operable to slide within the trough between a forward position proximate to the forward end, a rearward position proximate to the rearward end, and an intermediate position there between, wherein the trough defines a rear storage area between the storage console and the rearward end in the forward and intermediate positions of the storage console, and the trough defines a forward storage area between the storage console and the forward end in the rearward and intermediate positions of the storage console.

2. The vehicle system of claim 1, wherein the forward end is disposed beneath the dashboard.

3. The vehicle system of claim 1, further comprising:
    a hook coupled to the dashboard and operable between a stowed position and a use position, wherein the trough is positioned beneath the hook in the use position.

4. The vehicle system of claim 3, wherein the hook is positioned vehicle-rearward of the forward end in the use position.

5. The vehicle system of claim 3, further comprising:
    a shelf coupled to the dashboard and extending vehicle-rearward therefrom, wherein the hook is coupled to the shelf.

6. The vehicle system of claim 5, wherein the storage console is disposed beneath the shelf in the forward position.

7. The vehicle system of claim 1, wherein the storage console comprises:
    a receptacle; and
    a door operably coupled to the receptacle.

8. The vehicle system of claim 1, further comprising:
    a duct configured to convey conditioned air of an HVAC system, wherein the duct extends through an interior of the base.

9. The vehicle system of claim 1, wherein at least one of the plurality of seating assemblies comprises:
    a seat base;
    a seatback coupled to the seat base; and
    a drawer coupled to the seat base and operable between a first open position, a second open position, and a closed position there between, wherein the drawer in the first open position is positioned vehicle-forward of the drawer in the closed position, and the drawer in the second open position is positioned vehicle-rearward of the drawer in the closed position.

10. The vehicle system of claim 1, further comprising:
    a locking feature coupled to the storage console and operable between a disengaged condition and an engaged condition, wherein the locking feature is configured to prevent sliding movement of the storage console within the trough.

11. A vehicle system, comprising:
    a base coupled to a floor of the vehicle and comprising a trough that extends from a forward end to a rearward end; and
    a storage console operable to move within the trough between a forward position proximate to the forward end, a rearward position proximate to the rearward end, and an intermediate position there between, wherein the trough defines a rear storage area between the storage console and the rearward end in the forward and intermediate positions of the storage console, and the trough defines a forward storage area between the storage console and the forward end in the rearward and intermediate positions of the storage console.

12. The vehicle system of claim 11, wherein the storage console comprises:
    a bottom proximate to the trough;
    a receptacle coupled to the bottom;
    a door operably coupled to the receptacle; and
    a console shelf positioned between the bottom and the door and protruding outward generally toward the rearward end of the trough.

13. The vehicle system of claim 12, wherein the storage console further comprises:
    at least one console drawer operable to move from a closed position to an open position by sliding generally away from the rearward end of the trough, wherein the receptacle is positioned between the console shelf and the at least one console drawer.

14. The vehicle system of claim 11, wherein the base comprises:
    a first trough side wall;

a second trough side wall opposite the first trough side wall;

a rear trough end wall positioned between the first and second trough side walls; and a forward trough end wall positioned between the first and second trough side walls opposite the rear trough end wall, wherein the first trough side wall extends a first distance between the rear and forward trough end walls, and the rear trough end wall extends a second distance between the first and second trough side walls, wherein the first distance is greater than the second distance.

15. The vehicle system of claim 14, further comprising:
a duct configured to convey conditioned air of an HVAC system, wherein the duct extends through an interior of the base within the first trough side wall.

16. The vehicle system of claim 14, wherein the distance between the first and second trough side walls is smallest between the forward and rear trough end walls.

17. A vehicle system, comprising:
a floor;
a housing coupled to the floor and defining a transmission tunnel;
a trough coupled to the housing and comprising:
a first trough side wall;
a second trough side wall opposite the first trough side wall;
a rear trough end wall positioned between the first and second trough side walls; and
a forward trough end wall positioned between the first and second trough side walls opposite the rear trough end wall, wherein the first trough side wall extends a first distance between the rear and forward trough end walls, and the rear trough end wall extends a second distance between the first and second trough side walls, wherein the first distance is greater than the second distance; and
a storage console operable to slide within the trough between a forward position proximate to the forward trough end wall, a rearward position proximate to the rear trough end wall, and an intermediate position there between.

18. The vehicle system of claim 17, further comprising:
a duct configured to convey conditioned air of an HVAC system, wherein the duct extends within the first trough side wall vehicle-upward of the transmission tunnel.

19. The vehicle system of claim 17, wherein the trough defines a rear storage area between the storage console and the rear trough end wall in the forward and intermediate positions of the storage console, and the trough defines a forward storage area between the storage console and the forward trough end wall in the rearward and intermediate positions of the storage console.

20. The vehicle system of claim 17, wherein the storage console comprises:
a receptacle; and
a door operably coupled to the receptacle.

* * * * *

UNITED STATES PATENT AND TRADEMARK OFFICE
CERTIFICATE OF CORRECTION

PATENT NO. : 11,577,656 B2  
APPLICATION NO. : 17/085553  
DATED : February 14, 2023  
INVENTOR(S) : Harmon et al.

Page 1 of 1

It is certified that error appears in the above-identified patent and that said Letters Patent is hereby corrected as shown below:

On the Title Page

(73) Assignee:
"Ford Global Technologies, Inc." should be --Ford Global Technologies, LLC--.

Signed and Sealed this  
Eleventh Day of April, 2023

Katherine Kelly Vidal  
*Director of the United States Patent and Trademark Office*